Oct. 29, 1963 I. REHMAN ETAL 3,108,282

EAR DEFENDER POSITIONING AND MOUNTING APPARATUS

Original Filed Sept. 30, 1958 3 Sheets-Sheet 1

INVENTORS
IRVING (NMI) REHMAN
DALE C. GIBSON
BY

ATTORNEYS

Oct. 29, 1963 I. REHMAN ETAL 3,108,282

EAR DEFENDER POSITIONING AND MOUNTING APPARATUS

Original Filed Sept. 30, 1958 3 Sheets-Sheet 2

INVENTORS
IRVING (NMI) REHMAN
DALE C. GIBSON
BY
ATTORNEYS

EAR DEFENDER POSITIONING AND MOUNTING APPARATUS

Original Filed Sept. 30, 1958

INVENTORS
IRVING (NMI) REHMAN
DALE C. GIBSON
BY
ATTORNEYS

United States Patent Office 3,108,282

Patented Oct. 29, 1963

3,108,282

EAR DEFENDER POSITIONING AND MOUNTING APPARATUS

Irving Rehman, 5153 Tampa Ave., Tarzana, Calif., and Dale C. Gibson, 1977 Willow St., San Diego, Calif.

Original application Sept. 30, 1958, Ser. No. 764,459, now Patent No. 3,030,627, dated Apr. 24, 1962. Divided and this application Feb. 29, 1960, Ser. No. 11,935
4 Claims. (Cl. 2—6)
(Granted under Title 35, U.S. Code (1952), sec. 266)

This is a divisional application of application Serial No. 764,459, filed September 30, 1958, now Patent No. 3,030,627, dated Apr. 24, 1962, titled Multi-Duty Helmet.

The invention described herein may be manufactured and used by or for the Government of the United States of America for governmental purposes without the payment of any royalties thereon or therefor.

This invention relates to an ear defender positioning and mounting apparatus and more particularly to an ear defender positioning and mounting apparatus for use with a helmet where each ear defender is mounted independently on the helmet.

In the prior art, ear defender mounting and positioning techniques, the positioning and length adjustments were made directly at the ear defender itself or length adjustments were made on a common head band. Another feature common in the past was the inter-connecting of the two ear defenders resulting in an adjustment of one effecting the adjustment of the other. In the type mounted on a communications helmet, provision for moving the ear defender and/or earphone to standby positions forward of the ear or behind the ear was inadequate if any provision was made at all. These prior art techniques resulted in limited individual adjustment of ear defenders and resulted in discomfort to the wearer particularly if the wearer's head deviated in any degree from the norm from which the mounting apparatus was designed. Another disadvantage to the prior ear defender mounting and positioning apparatus lay in the technique for holding the ear defender against the head of the wearer. The compressing force was not directed toward the center of the ear defender and/or earphone, but from some point above the ear defender and/or earphone resulting in discomfort to the wearer, and in the case of a noise shield or ear defender application, a poor acoustical seal.

It is thus an object of the present invention to provide an improved ear defender positioning and mounting apparatus in which the individual ear defenders can be simply and easily adjusted.

Another object is the provision of an improved ear defender positioning and mounting apparatus allowing for universal adjustment.

A further object of the present invention is the provision of improved ear defender positioning and mounting apparatus in which the retaining pressure ensures comfort and a good accoustical seal because of an even peripheral pressure automatically applied to the head and circumaurally around the ear of the wearer.

According to one preferred embodiment of the invention, a pair of earphones are mounted within a pair of ear defenders, preferably of the circumaural acoustical seal variety. The ear defenders are mechanically connected to a pair of spring tension members through ball and socket joints at the center of the ear defenders. This results in pressure being applied to each ear defender at the very center thereof through the ball and socket joint, which seats the ear defenders automatically with an even peripheral pressure against the head and circumaurally around the ear of the wearer, providing a good acoustical seal and maximum comfort. The ball joint also allows for rotational movement of the ear defenders with respect to the suspension members. The spring tension members are attached to the respective sides of the helmet utilized in conjunction therewith, through a friction sliding mechanical joint. This, of course, allows for lengthening and shortening the spring tension member with respect to the head shape and size of the individual wearer. The slide-friction fitting is rotatably attached to the respective side of the helmet allowing for movement of the ear defender and/or earphone in a horizontal direction, i.e., swung on a horizontal axis for standby position ahead or behind the ear of the wearer. Thus, it is only necessary for the wearer to take hold of the ear defenders and push up or pull down for length adjustment and swing ahead or behind as he may prefer for use in a standby position. It is pointed out that the main objections of the prior art techniques have been overcome by these simple and inexpensive expedients.

Other objects and many of the attendant advantages of this invention will be readily appreciated as the same becomes better understood by reference to the following detailed description when considered in connection with the accompanying drawings wherein.

Figure 6A:
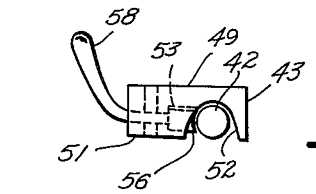
Figure 6B:
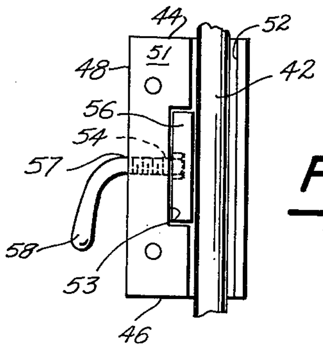
Figure 7:
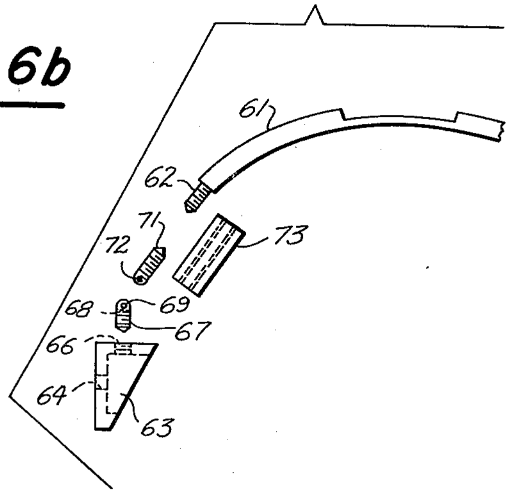
Figure 8:
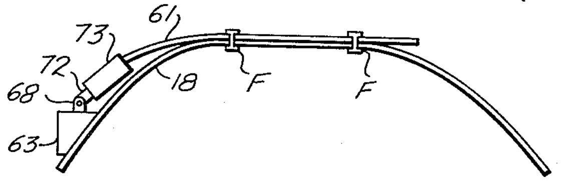

FIGS. 6*a* and 6*b* show details of the microphone boom adjustment;

FIG. 7 shows a modification of the helmet of this invention without the auxiliary equipment attached;

FIG. 8 shows an exploded detail of FIG. 7, and

Figures 2, 9:
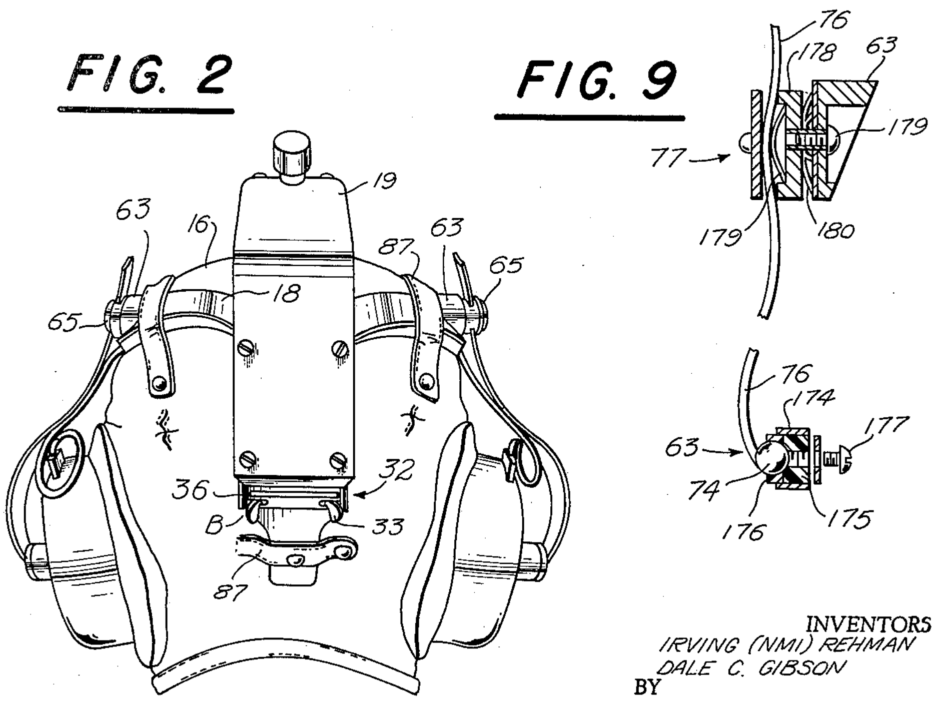
FIG. 2 shows the embodiment of FIG. 1 from the posterior view.

FIG. 9 is a side view of a tension member used to support special ear defenders, the attachment of the member being partially sectioned.

Figure 1:
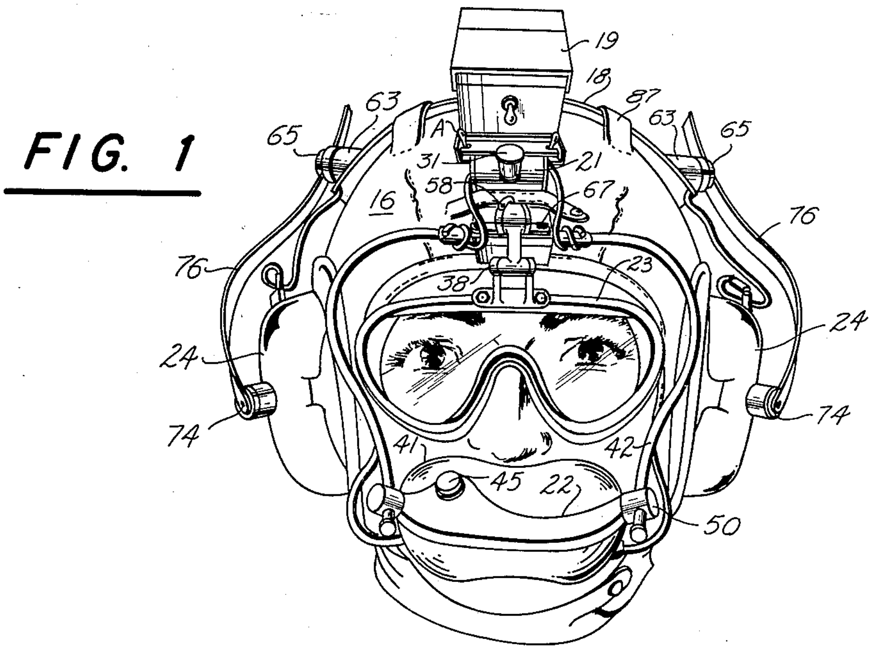
FIG. 1 shows the present invention utilized as a radio communications' helmet.
Figure 3:
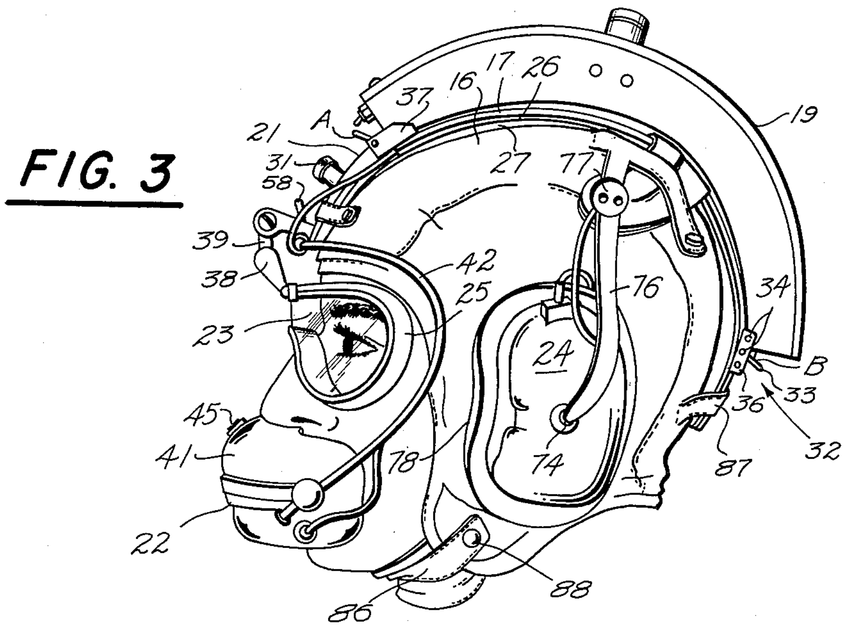
FIG. 3 shows the embodiment of FIG. 1 from the lateral view.

Referring now to the drawing, and particularly to FIGS. 1 to 3, a general description of the present invention will be given followed by a more detailed description of the individual features. FIGS. 1 to 3 illustrate a preferred embodiment of the present invention consisting basically of an individually fitted canvas head covering 16 on which is attached a flexible member 17 extending fore-and-aft along the canvas head covering 16, and an extension member 18 extending transversally to member 17 along the covering 16. A rigid member 19 is pivotally attached to member 17 at a forward point A and slideably attached at an afterpoint B. This member is also utilized as a transceiver housing. Attached to an adjustable extension 21 of the flexible member 17 are a noise shield and microphone assembly 22 and a visor 23, both of which are adjustable. Hearing defenders and transducers 24 are adjustably attached to the transverse extension member 18.

The flexible member 17 extends along the longitudinal axis of the head from the glabella area above the bridge of the nose to a point approximately one-half inch beyond the external occipital protuberance on the posterior aspects of the neck, and the transverse extension member 18 extends from the parietal area of one side to the parietal area of the other. The longitudinal member 17 is designed to loosely contour an anteroposterior axis of the head, and is separated from the scalp by means of foam rubber or plastic layers, or fluid-filled pads 26, 27 designed to adapt the longitudinal and transverse extension members more accurately to the contour of the skull and scalp. Pad 27 is so designed that it will project on to the posterior surfaces of the neck. It will therefore serve as an anchor or limiting pad to prevent the longitudinal member 17 from sliding forward on the scalp itself.

The longitudinal member consists essentially of two parts; an anterior portion 21 approximately 3 inches long which slides within the larger posterior portion 17 with a suitable adjustment 31 to compensate for differences in head lengths. This increase or decrease in anterioposterior length of the longitudinal mounting framework contributes to the universality of fit as well as variations in the amount of pressure applied to the scalp and skull of the wearer. The underlying pads 26, 27 may be formed of various suitable materials designed to more accurately adapt the mounting framework to the wearer. In this embodiment the pads consist of two parts. The upper pad 26 is permanently attached to longitudinal member 17 and is of a stock thickness. The lower pad 27 can be of any desired thickness, and is varied in accordance with shape and size of an individual wearer. This provides an additional variable to insure universality of fit. The size and contour adjustment pressure is thus accomplished by the same anterior adjustable member 31 so that a comfortable fit is thus to be obtained. Attached to the posterior part of the rigid longitudinal member 19 is the size and contour adjustment 32. This consists of a spring-loaded pin, or lever 33 that engages a series of holes 34 or slots in a frame portion 36 attached to the underside of the longitudinal member 17. A similar frame portion 37 is pivotally attached at the anterior part of the mounting framework to the rigid member 19. The size or contour of the surface resting directly upon the head of the wearer is determined by the selection of particular holes 34. This adjustment can be better understood by reference to FIG. 5 which shows a schematic representation of the principle involved. Point A corresponds to the fixed pivotal attachment A of FIG. 3. Point B corresponds to the adjustable spring-loaded attachment B of FIG. 3. The rigid and flexible members are given the same reference numerals in both figures to avoid confusion. It can be easily seen that if the adjustable connection at point B is moved to the right and downward, it will cause the flexible member 17 to move upward toward the position indicated by dotted line C. Conversely, if the spring-loaded adjustment corresponding to point B is moved upward and to the left on the flexible member, the flexible member will be caused to straighten out toward the position indicated by the dotted line D. The anteroposterior fore-and-aft, or longitudinal fit, may be further affected by adjusting the front piece—of the longitudinal portion of the helmet by means of the length adjustment 31 to more closely conform to the length of the head. Thus, the length as well as the contour or radius of curvature of an individual skull is compensated for by these two adjustments. The lateral curvature of the transverse extension member 18 may be changed by manually altering the size of the transverse member in the embodiment shown in FIGS. 1 through 4, or in the alternative as shown by FIGS. 7 and 8. The lateral extension members 18 may be provided with adjustment, using the identical principle shown by the schematic drawing of FIG. 5, to be described in detail.

Referring back to FIG. 3, several adjustments are possible by means of the slots or holes 34 being selectively engaged by the spring-loaded bar or plunger 33. This bar is lifted to free the back or posterior part of the flexible member of the mounting framework so that it is movable fore-and-aft within holes or slots 34. The front part of this flexible member 17 is pivotally attached to the mounting framework so that any movement of size or contour adjustment 32 of the back part of flexible member 17 produces an increase or decrease in the radius of the curvature and anteroposterior distance or size. An additional size adjustment is obtained by moving the adjustable member 21 of the longitudinal mounting framework. This sliding adjustment 31 also permits further adjustment to the visor 23 and noise shield 41 and microphone assembly 22 to compensate for minor variations in head height and face size. The visor 23, noise shield, and microphone assembly 22 are mounted on the movable member 21 and can be individually adjusted or changed as needed. Since these component parts are all freely adjustable or movable, any combination of accessory units may be used with the mounting framework.

Figure 4:
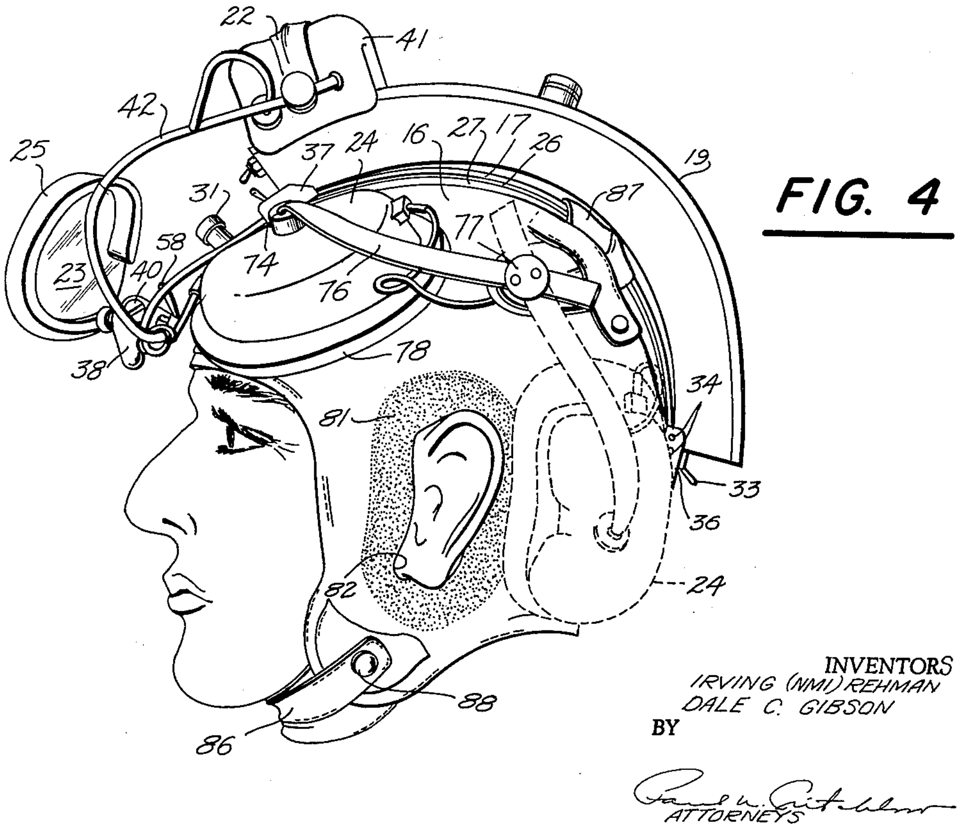
FIG. 4 shows the view of FIG. 3 with the microphone, visor, and earphones in standby position.
Figure 5:
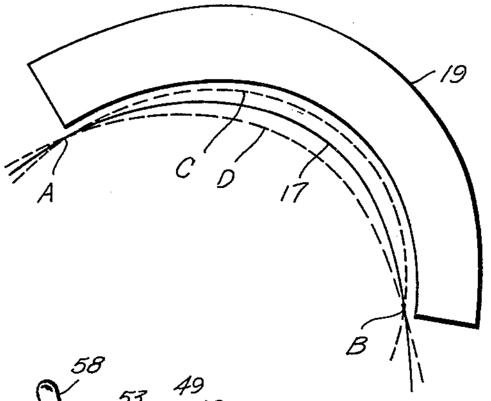
FIG. 5 is a schematic diagram illustrating the size and contour adjustment.

The visor 23 may be mounted by means of a hinge 38 on a universal type linkage 39 that allows movement in two planes. When in use, the visor is freely pressed against the periorbital structure, this pressure being evenly distributed by a rubber, plastic, or fluid seal 25. The lateral extent of the visor permits full peripheral vision as well as up and down. Minor contour adjustments may be made on the visor by manually bending the goggle framework. The framework is so mounted that it may be readily replaced by other types of visors to serve varying purposes in varying environments. As shown in FIG. 4, the visor 23 may also be turned up part way to serve as a glare shield or sun reflector. In the full stand-by position, the visor can be rotated upward to the point that contact is made with the transceiver housing 19. The tension of the universal joint 40 maintains the visor in any desired position.

The noise shield 41 when in use, contacts the perioral area and contains a noise cancelling microphone. A "push-to-talk" button 45 is positioned on the front side of noise shield 41. This positioning has a dual purpose. The first, of course, is to provide a readily accessible location whereby the button is found by automatic reaction i.e. no time is lost "feeling" for the button. The second function of this location is to enhance the noise seal made by the contact of the noise shield 41 around the perioral area. Thus, the microphone assembly 22 can be adjusted to make light physical contact with the wearer, since on transmitting, a close seal is necessarily made when the "push-to-talk" button 45 is depressed thereby pushing the assembly 22 in firm physical contact with the wearer. The position of the shield and microphone assembly 22 can be varied by sliding it along a boom 42 on either side. Two ball and socket type joints 50 suspend the noise shield 41 so that movement in all three planes may be obtained. The supporting boom 42 of the shield and microphone assembly 22 is wide in the temple areas to avoid the visor 23 and be lateral to the fields of peripheral vision. As shown in FIGS. 6*a* and 6*b*, a clamp is employed to permit adjustment of the microphone boom 42. The clamp consists of a rectangular block 43 having end faces 44, 46, side faces 47, 48 upper face 49 and lower face 51. As can be seen, lower face 51 has a semi-circular cut-away portion 52. Cut-away portion 52 has a counterbore 53 and passing outwardly from counterbore 53 to side face 48 is a threaded hole 54. A clamping piece 56 fits into counterbore 53. Integral with clamping piece 56 and passing through threaded hole 54 is a threaded member 57 with an extension handle 58. Rectangular block 43 has two tapped holes passing through from upper surface 49 to lower face 51 where, by means of screws 59, block 43 is mounted on longitudinal extension 21 (FIG. 1), microphone boom 42 can be easily affected by the wearer by unscrewing threaded member 57, adjusting the mike boom 42 to the desired position, and screwing threaded member 57 tightly in.

Referring now to FIGS. 7 and 8 in detail the modification incorporating the size and contour adjustments of the transverse extension member is shown which is identical in principle to the adjustments of the longitudinal member 17. In this embodiment, the transverse extension 18 is also constructed of a resilient material. A rigid transverse member 61 is attached to the flexible member 18 at F by rivets or other conventional means, such as spot welding. As the apparatus is symmetrical, one side will be described only, as illustrated, in the interest of simplicity, it being understood that there are identical elements and adjustments on each side. The rigid horizontal member 61 is terminated in a threaded end 62. Attached to the flexible member 18 is a hollow mounting block 63 with a bore 64 for receiving rotatable fittings 65 (FIG. 2), and a threaded bore 66 for receiving a screw 67. Screw 67 is equipped with a clevis 68 having eyes 69. Fitting into the clevis 68 of screw 67 is threaded member 71 with an eye 72. These elements are pivotally secured by means of a connection through their aforementioned eyes. Turnbuckle 73 is threadably engaged with threaded member 71 and the threaded end 62 of rigid member 61. It will be understood at this point that rotating the turnbuckle 73 will result in an overall change of length of the rigid member 61 and thus force a resulting change in the radius of curvature and contour of the flexible member 18. In the embodiment of FIGS. 1 through 4, additional fit and stability is provided by the ear defenders 24 as they contact the lateral aspects of the head, particularly in relation to the ear and mastoid areas. This adjustment accomplishes the result of adjusting the contour and size by changing the arc or radius of curvature of the flexible member of the mounting framework as set out above.

As shown in FIGS. 3, 4, and 9 the ear defenders 24 are mounted by means of a centrally located ball joint 74 to a spring tension suspension member 76, which, in turn, is mounted through a slide-swivel joint 77 to the mounting block 63 on the lateral extension member 18. The central position of the ball joint 74 distributes the pressure evenly around the ear from the spring suspension member 76. These features, in addition to providing a good acoustic seal, lends considerable lateral support to the entire helmet in conjunction with the lateral extension members 18. The rims 78 of the defenders 24 insure a good acoustic seal (FIG. 4). This latter feature will be further described in more detail.

As best shown in FIG. 9, each ball joint 74 is tacked to member 76 by spot welding or the like, the ball being enclosed in a metal or plastic ring 174 which houses a plastic block 175 provided with an annular seat. Also, ring 174 mounts an end closure 176 to maintain ball joint 74 and this member, as well as block 175 preferably are formed of an anti-friction material such as nylon or Teflon. The assembly is secured to the ear-defender by a screw 177 that threads into block 175.

At their upper ends, each tension member 76 is pivotally and slidably carried by mounting block 63 the slidable fitting being provided by extending member 76 through a slotted tension member block 178 that contains a leaf-spring 179 to maintain sufficient pressure for holding any set position. The pivotal mounting is achieved by securing tension member block 178 to mounting block 63 by a bolt 179 and by utilizing a spring washer 180 between the two blocks. The pivotal axis is about bolt 179 and the washer maintains sufficient tension to hold set positions.

The pliable head covering 16 is preferably constructed of canvas or plastic. A better acoustic seal about the ears is obtained by impregnating the side panels 81 of the cloth helmet 16 with latex or plastic. An opening 82 is cut out of this impregnated panel in the region of the ear to permit the ear to protrude through the pliable covering into the ear defenders 24. These impregnations also lend enough body to the head covering to obviate the necessity for ridging or lining the edge of apertures 82 i.e., the edges resist the tendency to curl or fringe. The head covering as illustrated is held in place by a chin strap 86. Mounting straps 87 are provided for holding the longitudinal flexible member 17 and the transverse extensions 18 thereof. These straps 87 are shown with snap fittings 88, but any conventional fastening means may be employed.

In general, the mass and weight of the helmet are distributed physiologically and functionally over the head and neck in order to be well tolerated by the wearer. The weight of the helmet and associated equipment mounted on or attached to it, is distributed so that the center of weight and gravity falls over the atlanto-occipital articulation and upper end of the vertebral column in a longitudinal axis. This tends to minimize the physiological need for increased tonic contraction of the sternomastoid, trapezius and erector spinalis muscles to maintain increased tonus and partial contraction to maintain the head in an erect position. This additional weight of the helmet and associated equipment is balanced with its center over the most cephalic part of the vertebral column. Movements of the head and neck are therefore not inhibited and a minimum of muscular activity is required to produce the normal movement of the head and neck.

The mounting of the support for the visor 23 and microphone assembly 22 (FIG. 1) are at the forward end of the mounting framework, and these, in turn, are counter-balanced by a transceiver and batteries located in the hollow rigid member 19. The batteries are placed as far aft in the enclosure as possible so that a low center of gravity is established which allows the wearer to be relatively unaffected by the weight of the helmet and equipment.

The visor 23 (FIG. 1) is mounted from the front or anterior part of the mounting framework. It utilizes a fluid or plastic pressure seal 25 (FIG. 1) which provides a wide distribution of pressure thus provides a good seal against bony land marks and avoids excessive pressure.

The ear defenders and receivers 24 also take advantage of the extensive contact surface to distribute pressure exerted against the head in order to obtain a good acoustics seal. The defenders rest against the posterior aspects of the zygomatic arch, the superficial temporal vessels, and the mastoid process. The major nerve and vessels are not compressed, although their terminal branches may be covered by the fluid seal defender. The facial nerve lies at a deeper level, and therefore, is not affected. The defenders and receivers as additional equipment add some weight to the helmet, this weight lies on a horizontal axis passing through the center of rotation of the head upon the neck, and therefore, causes no additional strain to the muscles of the neck.

Since the transverse extension member lies anterior to the external auditory canal where the superficial temporal vessels, temporal muscles and facial nerve branches lie, pressure will not be applied to these structures, and freedom of anatomical and physiological action results. The transverse extension member 18 of the mounting framework also lies anterior to the occipital vessels and the lesser occipital nerve, so that no pressure is brought to bear on these structures. The padding beneath the transverse member 18 contacts the parietal area of the head in a non-vital area, thus permitting long comfortable wearing of the helmet. This position of the transverse extension member 18 also permits placing the ear defenders 24 in a stand-by position over the occipito-mastoid or temporal-frontal area. The receivers within the ear defenders are thus functional in the stand-by position, utilizing air borne transmission and bone conduction through the mastoid process or temporal-frontal bone. These stand-by positions are illustrated in FIGURE 4.

It is seen that the actual weight supporting mounting framework of this helmet does not overlie any of the major anatomical structure enervating the scalp or supplying the scalp with blood. Physiological and anatomical interference such as ischemia, therefore, does not occur, and normal activity is present. Thus comfortable wearing of the helmet for extended periods of time results without loss of efficiency or fatigue.

It should be understood that the foregoing disclosure relates only to a particular communications embodiment of the invention. This invention is not restricted to use in noise attenuation or radio communications, but is susceptible to use in any supporting application especially where a mounting support is required, as for example: in head restraint; in the medical field for the support of a head mirror or light; in the diving or aviation field for the support of visors, face masks and breathing apparatus; or modified for helmet use. It is also pointed out that the longitudinal members permit attachment of a restraint mechanism to limit the range of movement of the head and neck to a non-traumatic extent, i.e., in sudden decellerations that result in whiplash injuries.

Obviously many modifications and variations of the present invention are possible in the light of the above teachings. It is therefore to be understood that within the scope of the appended claims the invention may be practiced otherwise than as specifically described.

What is claimed is:

1. In a helmet of the type carrying auxiliary equipment, an improved ear defender mounting and positioning apparatus comprising a pair of ear defenders, a pair of spring tension suspension members adapted to extend one along each side of the helmet, a ball and socket joint means interconnecting each of said tension members to a central portion of each ear defender, and pivotal means attaching the other end portion of said members to said helmet for permitting the defenders both to be operationally positioned over the ear and each to be swung on a horizontal axis away from the ear into a standby position, said pivotal means being formed for slidably receiving its tension member for permitting length adjustments, and said ball and socket joint means permitting both a rocking and a rotational movement of said defenders relative to said tension members whereby the defenders readily adapt to varying head contours said spring tension members being formed of flat elongate spring strips flexed between their points of attachment for exerting inward pressure on both of said attachment points.

2. The apparatus of claim 1 wherein said ear defenders are each formed of a pad of soft resilient material adapted in size and shape for encircling in a spaced relationship the external ear of a wearer.

3. The apparatus of claim 1 wherein each of said pivotal means comprises a mounting block carried by said helmet, and a clamping mechanism rotatably carried by each block, said tension members each extending slidably through its clamping mechanism and being frictionally engaged thereby.

4. The apparatus of claim 3 wherein said ear defenders are each formed of a pad of soft resilient material adapted in size and shape for encircling in a spaced relationship the external ear of a wearer.

References Cited in the file of this patent

UNITED STATES PATENTS

| | | |
|---|---|---|
| 894,258 | Cobb | July 28, 1908 |
| 2,282,830 | Scudder et al. | May 12, 1942 |
| 2,782,423 | Simon et al. | Feb. 26, 1957 |
| 2,858,544 | Roth | Nov. 4, 1958 |
| 2,486,267 | Dulinsky | Oct. 25, 1962 |